United States Patent
Poulopoulos

(10) Patent No.: US 10,384,868 B1
(45) Date of Patent: Aug. 20, 2019

(54) TRASH CAN STABILIZER

(71) Applicant: John Peter Poulopoulos, Mount Prospect, IL (US)

(72) Inventor: John Peter Poulopoulos, Mount Prospect, IL (US)

( * ) Notice: Subject to any disclaimer, the term of this patent is extended or adjusted under 35 U.S.C. 154(b) by 0 days.

(21) Appl. No.: 15/710,234

(22) Filed: Sep. 20, 2017

Related U.S. Application Data

(60) Provisional application No. 62/398,488, filed on Sep. 22, 2016.

(51) Int. Cl.
| | |
|---|---|
| *A47G 23/02* | (2006.01) |
| *B65F 1/14* | (2006.01) |
| *F16M 11/04* | (2006.01) |
| *F16M 11/26* | (2006.01) |

(52) U.S. Cl.
CPC ........... *B65F 1/141* (2013.01); *F16M 11/041* (2013.01); *F16M 11/26* (2013.01)

(58) Field of Classification Search
CPC ........ B65F 1/1415; B65F 1/06; B65F 1/0006; B65F 1/141; B65F 2240/12
USPC ...................................... 248/95, 97, 99, 101
See application file for complete search history.

(56) References Cited

U.S. PATENT DOCUMENTS

| | | | |
|---|---|---|---|
| 2,501,762 A | 3/1950 | Davis, Jr. | |
| 2,522,778 A | 9/1950 | Cannon | |
| 2,582,906 A | 1/1952 | Heldenbrand | |
| 2,639,113 A | 5/1953 | Kriz | |
| 2,661,921 A | 12/1953 | Brustein | |
| 2,732,155 A | 1/1956 | Stanley | |
| 2,808,173 A | 10/1957 | Patnode | |
| 2,937,760 A | 5/1960 | Williams | |
| 3,091,342 A | 5/1963 | Crump | |
| 3,295,691 A | 1/1967 | Bowman | |
| 3,306,464 A | 2/1967 | Rogers | |
| 3,491,895 A | 1/1970 | Warwick et al. | |
| 3,739,431 A | 6/1973 | Scioloro | |
| 3,924,913 A | 12/1975 | Cooper | |
| 3,990,654 A | 11/1976 | Michael | |
| 4,527,695 A | 7/1985 | Arms | |
| 4,741,494 A | 5/1988 | Voornas | |
| 4,880,418 A * | 11/1989 | Tramont | A61B 17/42 604/356 |
| 4,940,201 A * | 7/1990 | Kurth | B65B 67/12 248/101 |
| 5,163,645 A * | 11/1992 | Caruso | B65B 67/1227 248/99 |

(Continued)

*Primary Examiner* — Steven M Marsh
(74) *Attorney, Agent, or Firm* — Winston & Strawn LLP

(57) ABSTRACT

A trash can stabilizer which can be mounted on the ground and includes flexible arms on a fixed vertical support. The support includes a base leg composed of at least two flat plates adapted to be slid along a track built on the base leg; an adjustable back plate; and at least two support bars in direct communication with the base leg and the back plate. The stabilizer includes at least two arcuate shaped flexible arms adapted to effectively hold and stabilize a trash can or the like wherein the arcuate shaped flexible arms are in direct communication with and extending horizontally from the back plate and wherein the flexible arm can conform to any shape or size of a trash can or the like such that the flexible arm can securely keep the trash can in place and thereby stabilize the trash from tipping or being knocked over.

20 Claims, 8 Drawing Sheets

(56) References Cited

U.S. PATENT DOCUMENTS

| | | | |
|---|---|---|---|
| 6,488,241 B1* | 12/2002 | Kyte | B65B 67/1216 |
| | | | 248/95 |
| 6,732,880 B1 | 5/2004 | Nash, Sr. | |
| 6,739,565 B1 | 5/2004 | Spadafora | |
| 7,066,475 B2* | 6/2006 | Barnes | B62B 1/14 |
| | | | 280/35 |
| 7,431,246 B1 | 10/2008 | Habib | |
| 7,654,407 B1 | 2/2010 | Obrecht et al. | |
| 8,181,918 B2* | 5/2012 | McCloud | A61M 16/0875 |
| | | | 248/125.8 |
| 8,833,710 B1 | 9/2014 | Atkinson | |
| 2005/0275178 A1* | 12/2005 | Huesdash | A47B 57/482 |
| | | | 280/47.35 |
| 2014/0091100 A1 | 4/2014 | Wan | |

\* cited by examiner

TRASH CAN STABILIZER

This application claims the benefit of U.S. application No. 62/398,488 filed Sep. 22, 2016, the entire content of which is expressly incorporated herein by reference thereto.

BACKGROUND OF THE INVENTION

Field of the Invention

The present invention generally relates to a trash can, refuse container or receptacle stabilizer or the like, and more particularly, to a trash can stabilizer of the kind that has a flexible arm that receives the can and assists in holding the can upright against external wind or other forces that would tend to tip over the can. The stabilizer is also height adjustable for the attachment to the outside of an upper portion of a trash can in order to effectively hold and stabilize the trash can.

Description of the Prior Art

A common problem that is experienced with the use of trash cans whether placed indoors or in an outside area is effectively keeping the trash cans upright and where they belong at all times. For example, it is not uncommon that trash cans can overturn, are tipped over and thereby spilling their contents caused by severe weather conditions like winds, storms or hurricanes, or by wild roaming animals, or other disturbances caused by human behavior such as vandalism or accidental tipping or knocking over of the can. Another common problem is keeping the trash can tightly covered in order to maintain the contents dry, prevent escape of odors, avoid attraction of flies and the like. While trash can stabilizers for the purpose of preventing trash cans from tipping over have been provided heretofore, they have generally been found undesirable for a number of reasons, such as the fact that they were required to be made of a plurality of separate parts welded, or otherwise secured together. Thus, in addition to being uneconomical to manufacture, the prior art devices teaching trash can holders in general have i) either been so constructed that removal and replacement of trash cans have been rather difficult, ii) have not been aesthetically pleasing to look at, iii) have not provided easy adjustability of the height, nor the length of the device, iv) have not afforded easy and simple flexibility to secure the trash can of virtually any shape or size sufficiently without having to lift the trash can to securely place it in a close proximity of the device, or v) have not been constructed in such a way that would allow objects to roll or slide over the device if mounted over a sidewalk.

There exist prior art references generally directed to stabilizing trash cans, refuse containers or the like. For example, U.S. Pat. No. 2,522,778 is directed to a holder for garbage cans or the like, which supports the trash can above the ground, while at the same time permitting the placement on or removal of the garbage can from the support. U.S. Pat. No. 2,522,778 provides a holder or support for garbage cans which includes an upright post and hook means fixed relative to the upper portion of the post for engagement with one of the loop handles on the garbage can so as to support the garbage can from the post. The garbage can holder of the kind described in U.S. Pat. No. 2,522,778 deals with a channel shaped post, which in one form of the invention is of U-shape in transverse section, and in another form of the invention is of Z-shape, wherein the latter shape being designed is for supporting two garbage cans.

U.S. Pat. No. 2,582,906 teaches a rotatably supported garbage can rack including a vertically extending fixed pipe standard having a bearing formed adjacent its lower end, and a sleeve mounted for rotation thereon having wedge-shaped mounting brackets secured to its opposite sides adapted to be engaged by complementary wedge-shaped supporting brackets on the supported garbage cans, together with arcuate members on the cans disposed below the brackets, which are adapted to contact the curved outer surface of the sleeve to embrace the garbage cans when supported thereon.

U.S. Pat. No. 2,639,113 is concerned with a holder for trash or garbage containers so as to securely hold the container in a fixed upright position and having a simple, manually operated control for releasing the container for emptying. U.S. Pat. No. 2,639,113 also provides a container holder having mounted thereon a cover for the container and foot actuated means for opening and closing the cover over the container, and further to provide a device having securing and covering means for an open top container, wherein operation of the securing means to release the container automatically removes the covering means.

U.S. Pat. No. 2,661,921 discloses a garbage can support that does not interfere with the removal or replacement of the trash can with respect to the garbage can support. The garbage can support can be stacked in nesting relation with a plurality of other garbage can supports, or nested for shipping or for storage purposes.

U.S. Pat. No. 2,732,155 discloses a support for refuse receptacles and lids, and in particular, to a support, wherein a lid-engaging arm is spring-connected to a rotatable support member, whereby the lid is held in either the open or closed position, and whereby the lid may be rotated out of axial alignment with the body of the receptacle.

U.S. Pat. No. 2,808,173 is concerned with a garbage can or receptacle holder, which is constructed and arranged to provide means for attaching the lid of the can to the holder to retain the lid in position. The receptacle holder is constructed in the form of a ring adapted to surround the upper portion of the garbage can, and to pivotally attach the ring to an adjacent supporting structure, in order to swing the ring and the lid upwardly into an open position. Moreover, U.S. Pat. No. 2,808,173 provides means for automatically locking the ring in either its raised or lowered position.

U.S. Pat. No. 2,937,760 discloses a garbage can holder, wherein the garbage can is supported above the ground, whereby the garbage can becomes spill proof. The garbage can holder has a body member having an open end and a hollow portion for receiving a support, whereby the body member is mounted on the support, and a plurality of hook members secured to the body member; and a manifold of support members positioned in opposed relation on opposite sides of the body member with each of the support members in line with a respective hook member and fastening members connecting the support members for retaining the support members in position on the body member.

U.S. Pat. No. 3,091,342 relates to receptacle supports and holders, and more particularly, to such supports and holders comprising a support means for supporting a receptacle, and holder means for retaining the receptacle in a certain position. An important feature taught in U.S. Pat. No. 3,091,342 is to provide a receptacle support, which is particularly adapted to support and retain against swaying, tipping, jarring or the like activity.

U.S. Pat. No. 3,295,691 describes a support device for a receptacle comprising in combination a ground-engaging support; a first abutment means for engaging an associated receptacle to support the device by the receptacle; and a second abutment means for engaging the associated receptacle to retain the receptacle by the support device.

U.S. Pat. No. 3,306,464 relates to a holder which is adaptable for use with either stationary or movable support means. The invention also provides for easier transport of the receptacles when full and makes it possible to position a plurality of receptacles for easy access to any selected one. The plurality of cans are freely rotatable about a vertical post with anti-friction means being provided to facilitate the revolving action. Another object of U.S. Pat. No. 3,306,464 is to provide a receptacle holder, wherein the ability to freely pivot the receptacles about a vertical post prevents the overturning of the wheeled base, and further provides for automatic centering of the load over the axle of the base so as to require very little effort to move a plurality of loaded receptacles.

U.S. Pat. No. 3,739,431 discloses a trash can holder in the form of a double end clip, which is fabricated from metal rod stock for joining a group of three or four trash cans to restrain the cans against overturning. The clip has a central connecting portion providing a handle and terminating in pairs of depending arms for straddling the rims of adjacent trash cans so as to hold the latter against separation and thereby overturning.

U.S. Pat. No. 3,990,654 teaches a holding device for detachably holding a garbage can to a link fence at any desired height. The garbage can is firmly held to the holding device by a wedge-like portion of the holding device, which extends between a handle of the garbage can and the garbage can. A projecting member of the holding device projects through any one link of the link fence, and joins with the upper and lower parts of that link to bind the holding device thereto. Radially extending arm members of the holding device join with the link fence to maintain the holding device in a parallel position to the link fence. The garbage can is partially encircled by a portion of the holding device so as to prevent any wavering of the garbage can while it is secured to the holding device.

U.S. Pat. No. 4,527,695 is concerned with a rack for supporting and retaining garbage cans, which includes a vertically extending supporting member, a pair of vertically spaced, horizontally extending arms each attached at a central portion of the respective arm to the supporting member, a pair of supporting elements each secured at a point on the periphery thereof to the lower of the two horizontally extending arms, and a pair of horizontally spaced handle retention tabs secured to the upper of the horizontally extending arms above the points of securement of the lower of the horizontally extending arms to the supporting elements.

U.S. Pat. No. 4,741,494 is directed to a universal garbage can holder of a type having a sleeve adapted to be buried onto the ground. First and second semi-rigid strips of metal or the like are provided such that one end of each strip will extend around one side of a garbage can. The other ends thereof are attached to an upper portion of the post. The semi-rigid strips are bendable such that they can be bent to adjust to garbage cans of various sizes.

U.S. Pat. No. 6,739,565 is directed to a trash can hold down apparatus, which is attached to the sides of a conventional household trash can in order to permit engagement by a person's feet to restrain vertical movement of the trash can when the trash bag liner is removed from the trash can. The hold down apparatus is formed with an upright portion and an integral engagement portion that projects generally orthogonally from the upright portion. The engagement portion is free to move relative to the upright portion to allow the engagement portion to rest on the surface of the floor irrespective of the angle at which the upright portion is attached to the sides of the conventional household trash can. The upright portion is provided with an adhesive attachment device to fix the upright portion to the sides of the trash can. The attachment device is in the form of a hook and loop fastener to permit the hold down apparatus to be detached from the trash can. The engagement portion is formed with a ridge to provide some limited rigidity at a distance spaced from the upright portion so as to not affect the flexibility of the apparatus in mounting to different configurations of trash cans.

U.S. Pat. No. 7,431,246 contemplates a refuse container holder for physically stabilizing refuse containers, especially when those refuse containers are positioned at the curbside in front of the residence. A device includes a vertical element, that includes an upwardly directed hook that is capable of engaging a handle on a refuse container, such that the refuse container cannot be overturned or moved by the wind but can easily be lifted off the hook by a refuse collector and may include a plastic casing. Each refuse container has a groove in its bottom surface adapted to engage the horizontal element, and thereby enhance the stability of the refuse container on the horizontal element.

U.S. Pat. No. 7,654,407 discloses a garbage can holder including a tubular member, which is embedded onto the ground, and has a garbage can holder mechanism vertically movably mounted therein between a lowered position and a raised position. When the garbage can holder mechanism is in its lowered position, the garbage can holder of this invention is not visible. When it is necessary to place garbage cans at curbside or the like, the garbage can holder mechanism is raised from its lower position to its upper position and the garbage cans are attached thereto and supported thereby.

U.S. Pat. No. 8,833,710 relates to a garbage can retaining device adapted to retain garbage cans and to mount to any substantially planar surface such as natural ground or man-made materials. The device includes: a mount member adapted to mount the garbage can retaining device to any substantially planar surface, wherein the mount member is adapted to receive a shaft and base assembly within an interior region and to fixedly secure the shaft and base assembly to the mount member, the shaft and base assembly including a shaft having a plurality of attachments attached thereto; a garbage can contacting portion secured to the shaft; and a base securely formed with the shaft adapted to be slidably received.

Notwithstanding the above, while the prior art references may describe various uses and forms of garbage can or refuse retaining devices, there still remains a need for improved devices that are easier to use and that more securely hold the trash can upright. Such an improved device is now provided by the present invention.

SUMMARY OF THE INVENTION

The invention relates to a trash can stabilizer that has support arms that are readily adjustable and that receives a trashcan therein. The arms include built-in portions that create increased tension on the trash can, so that the can be easily received in the support arms and can effectively be stabilized therein.

The trash can stabilizer of the invention is configured for holding and maintaining a trash can in a stationary position. In particular, the trash can stabilizer comprises a back plate for mounting of the stabilizer on a surface; and a pair of elongated arms associated with and extending away from the support plate, each arm having a first portion which faces that of the other arm and being initially positioned so that an opening is provided between the arms, wherein the opening is smaller than the trash can that is to be received therein, with the arms also having forward ends which are spaced apart from each other so that the trash can is insertable into the opening by moving the forward ends of the arms away from each other and after being inserted therein, the trash can is secured in the arms as the flexible arms attempt to return to their initial position. In this embodiment, the back plate can be mounted on a building or fence in a location where the trash can is to be located.

Preferably, each arm is flexible and is attached to the back plate to extend horizontally away from the back plate, with the first portions conforming to the cylindrical trash can that is to be received therein. Also, the forward end of each arm may include a second, preferably arcuate portion that faces away from the opening to facilitate movement of the arms away from each other by passing the trash can past and between the flexible arm ends.

In another embodiment, the trash can stabilizer further comprises at least one or two vertically adjustable support bars extending from the back plate towards the ground for placement of the back plate at a predetermined vertical position wherein the arms are located at a height that is sufficient to hold an upper portion of the trash can. Two support bars are generally present, each including telescopic portions that are adjustable to place the back plate in the predetermined vertical position. The adjustability is achieved by providing the two support bars with a plurality of holes and pin members such that back plate can be adjusted to a desired height by selectively placing pins in the desired holes in the support bars. In this embodiment, the stabilizer can be mounted on the ground in any desired location.

To assist in this mounting, the trash can stabilizer can further comprise a ground base plate for association with the support bars for mounting the stabilizer on the ground. Also, at least two additional base plates may be provided for forming horizontal legs for supporting the support bars in a vertical position, with the legs extending below the flexible arms and away from the support bars. Preferably, the base plates each include first and second leg members so that the base plates have an adjustable length. Also, the base plates each include an aperture for receiving a stake that can be driven into the ground to secure the stabilizer in position.

In the trash can stabilizers of the invention, the arms, back plate, and base plates are made of metal or plastic. Furthermore, each flexible arm includes at least one loop attached thereto for receiving a rope, cord or elastic band to assist in securing the trash can lid to the trash can as well or to assist in holding the trash can between the arms.

The invention also relates to a method for physically holding a trash can in a stationary position comprising the steps of providing a trash can stabilizer as disclosed herein; and inserting a trash can between the arms and into the opening to stabilize the trash can therein. In this method, the back plate may be mounted on a wall or fence, or upon one or more vertical support bars. The support bars are preferably associated with one or more base plates for mounting the stabilizer on the ground.

In a preferred embodiment, the trash can stabilizer includes a base leg composed of at least two flat plates, which are adapted to be slid in a horizontal direction along a track built on the base leg, and wherein at least two of the base plates are situated opposite one another on the trash can stabilizer and are in direct perpendicular physical communication with a third base plate forming the back portion of the base leg of the trash can stabilizer; ii) a back plate; iii) at least two vertically adjustable support bars in direct physical communication with the base leg and the back plate, wherein the at least two support bars are used to connect the back plate to the base leg, and further wherein the at least two support bars extend vertically from the end of the base leg; iv) and at least one arcuate shaped flexible arm having a plurality of loops attached to its sides configured to effectively hold and stabilize a trash can, wherein the arcuate shaped flexible arm is in a direct communication with and is extending horizontally from the back plate, and further wherein the flexible arm can easily conform to any shape or size of the trash can, such that the flexible arm can securely keep the trash can in place, and can thereby stabilize the trash can without the trash can tipping over. The plurality of the flat plates of the base leg comprise a plurality of holes, such that the trash can stabilizer can be mounted onto the ground. The back plate equally comprises a plurality of holes, whereby that the trash can stabilizer can be mounted against a vertical fixed surface. The at least two support bars comprise a plurality of holes, whereby the height of the trash can stabilizer can be easily adjusted by placing pins through the plurality of the holes of the support bars. Further the base leg, the back plate, the support bars and the arcuate shaped flexible arm are made of a material characterized by being either metal or plastic. The ends of the arcuate shaped flexible arm curves in substantially outward direction, whereby tension is advantageously created, such that the trash can may effectively be secured by the flexible arm and maintained in place at all times.

Another aspect of the present invention relates to a method for physically holding a trash can in a stationary position comprising the steps of:

i) providing a trash can stabilizer according to the description above;

ii) adjusting the horizontal length of the base leg at a desired level by sliding the at least two flat plates along the track constructed on the base leg;

iii) inserting a plurality of studs into a plurality of holes on the base leg;

iv) mounting the trash can stabilizer according to the above description onto the ground;

v) adjusting the vertical height at a desired level of the at least two support bars;

vi) inserting a plurality of studs into a plurality of holes on the back plate;

vii) mounting the trash can stabilizer according to the above description against a fixed vertical surface;

viii) opening the arcuate shaped flexible arm by extending the ends in an outwardly direction simultaneously; and ix) placing the trash can inside the area of the arcuate shaped flexible arm whereby the trash can is efficiently stabilized and held in an upright position afforded by the tension created by the arcuate shaped flexible arm.

BRIEF DESCRIPTION OF THE DRAWINGS

These and other advantages of the present invention will become apparent from the subsequent detailed description of the invention and the appended claims taken in conjunction with the accompanying drawings, wherein:

DETAILED DESCRIPTION OF THE PREFERRED EMBODIMENTS

Figure 1:
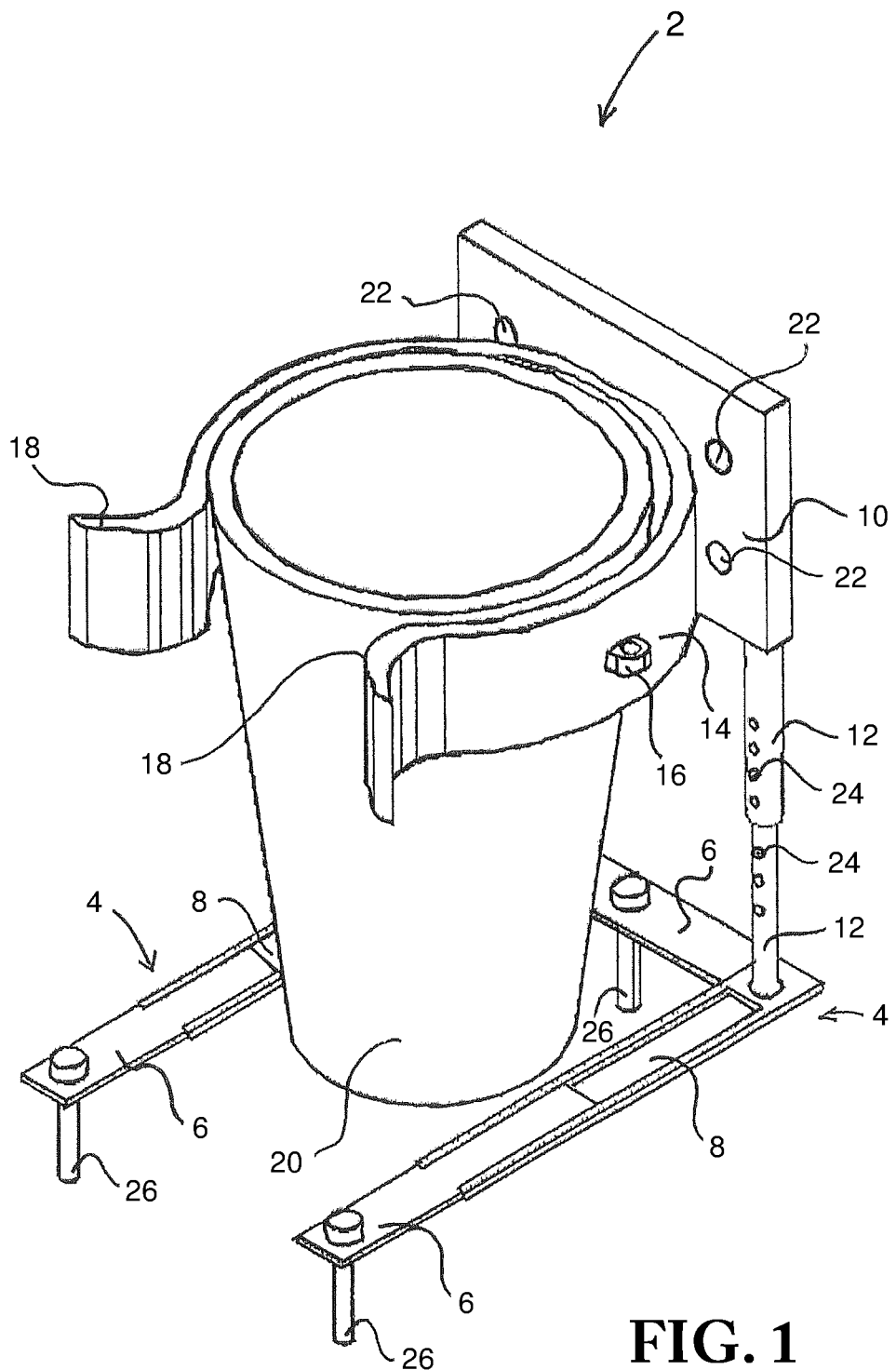
FIG. 1 is a perspective view of an embodiment of the trash can stabilizer in use holding and stabilizing a trash can.

In this respect there has thus been outlined rather broadly the more important features of the instant invention, in order that the detailed description thereof that follows may be better understood, and in order that the present contribution to the art may be better appreciated.

There are additional features of the instant invention, which will be described hereinafter, and which will form the subject matter of the claims appended hereto.

Further in relation to this, before explaining at least the preferred embodiments of the invention in greater detail, it is to be understood that the invention is not limited in its application to the details of construction and to the arrangements of the components set forth in the following description, or illustrated in the appended Figures. The invention is capable of other embodiments, and of being practiced and carried out in a plurality of different ways. Also it is to be understood that the terminology used herein is for the purpose of description and should not be regarded as a limiting factor.

As such, those having ordinary skill in the art will appreciate that the conception upon which this disclosure is based may also be utilized as a basis for designing other structures for carrying out the several purposes of the present invention. It is therefore equally important that the claims be regarded as including such equivalent constructions, insofar as they do not depart from the spirit and scope of the present invention.

As a preliminary matter, it will readily be understood by one having ordinary skill in the relevant art that the present invention has broad utility and application. Furthermore any embodiment discussed and identified as being "preferred" is considered to be part of a best mode contemplated for carrying out the present invention. Other embodiments also may be discussed for additional illustrative purposes in providing a full and enabling disclosure of the present invention. Moreover many embodiments such as adaptations, variations, modifications, and equivalent arrangements will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed to limit the scope of patent protection afforded by the present invention, which scope is to be defined by the claims and the equivalents thereof. It is not intended that the scope of patent protection afforded the present invention be defined by reading into any claim a limitation found herein that does not explicitly appear in the claim itself.

Thus for example any sequence(s) and/or temporal order of steps of various processes or methods that are described herein are illustrative and should not be interpreted as being restrictive. Accordingly, it should be understood that although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders, while still falling within the scope of the present invention. Accordingly, it is intended that the scope of patent protection afforded the present invention is to be defined by the appended claims rather than the description set forth herein.

Additionally it is important to note that each term used herein refers to that which the ordinary artisan would understand such term to mean based on the contextual use of such term herein. To the extent that the meaning of a term used herein as understood by the ordinary artisan based on the contextual use of such term differs in any way from any particular dictionary definition of such term, it is intended that the meaning of the term as understood by the ordinary artisan will prevail.

The following definitions generally set forth the parameters of the present invention.

As used herein, the term "arm" refers to the structural unit of the trash can stabilizer that is in direct contact with, holds and maintains the trash can in an upright position continuously. As noted herein, these arms are preferably flexible to contact and/or conform to the trash can that is to be held therein.

As used herein, the term "loop" refers to structures added to the sides of the flexible arm, to which an elastic band, rope or cord can be attached to secure a trash can lid to the trash can. For example, the elastic band or cord can run across the top of the lid, with one end attached to one loop, and the other end attached to the other loop. Also, the band or cord can extend from the lid of a trash can or any other refuse container and be attached to the loop with a hook or by stitching. And the invention contemplates a number of other features that can be provided to secure the trash can lid to the trash can. These additional or alternative features include handles, clips, straps and buttons, flanges, knobs, slots, holes, screws or other fasteners, latches or magnets for steel trash cans.

As used herein, the term "base leg" refers to the structural unit of the trash can stabilizer made up by a plurality of flat plates, wherein the base leg makes a physical contact with portions of the ground onto which the trash can stabilizer is mounted.

As used herein, the term "perpendicular" refers to an angle of 90° to a given line, plane, or surface.

As used herein, the term "track" refers to a structure built on the base leg, such that the length of the plurality of the flat plates can be adjusted horizontally at any desired level before the use of the trash can stabilizer.

As used herein, the term, "back plate" refers to the unit of the trash can stabilizer used to mount it on a vertical fixed support surface.

As used herein, the term "support bar" refers to the vertically adjustable structural units of the trash can stabilizer used to connect the back plate to the base leg.

As used herein, the term "pin" refers to a piece of metal with a point at one end and a round head at the other used merely for fastening purposes.

As used herein, the terms "stud" and "stake" refer to a large-headed piece of metal that pierces and projects from a surface.

As used herein, the term "longitudinal" refers to the running lengthwise rather than across the width of a material.

As used herein, the term "transverse" is used interchangeably with the term "horizontal" and as such, has the same meaning.

As used herein, the term "height" is the measurement of a vertical distance, whereas the term "length" is the measurement of a horizontal distance.

As used herein, the term "tension" refers to a pulling force exerted by a one-dimensional continuous object.

As used herein, the term "compression" refers to the application of inward forces to different points on a material or structure so as to reduce its size in one or more directions.

As used herein, the term "plastic" refers to any of a wide range of synthetic or semi-synthetic organic solids that are malleable.

As used herein, the term "metal" refers to any material such as but not limited to an element, compound, or alloy that is typically hard, opaque, shiny, has good electrical and thermal conductivity, and further that is malleable.

As used herein, the term "malleability" refers to a material's ability to deform under compressive stress.

As used herein, the term "opposite" refers to something having a position on the other or further side of something else, thus facing something, especially something of the same type.

As used herein, the term "arcuate" refers to a structure that is curvilinear.

As used herein, the term "stationary" refers to an object that is not moving.

As used herein, the term "diameter" refers to any straight line segment that passes through the center of a circle or half-circle, and whose endpoints lie on the circle or half-circle.

As used herein, the term "sufficient" is meant to have the equivalent meaning of adequate and enough.

As used herein, the term "substantially" is meant to have the equivalent meaning of essentially, largely, considerably or the like.

As used herein, the term "maximum" refers to the greatest quantity or value attainable or attained.

As used herein, the term "minimum" refers to the least quantity assignable, admissible, attainable or possible.

As used herein, "a" and "an" each generally denotes "at least one" but does not exclude a plurality unless the contextual use clearly dictates otherwise.

As used herein, the singular form "a", "and", and "the" include plural referents unless the context clearly dictates otherwise.

The present invention provides an easy-to-use improved trash can stabilizer, which has multi-functionality. Thus, the trash can stabilizer is highly universal and is able to accept trash cans of many different sizes and shapes. However having said that, a skilled artisan would understand that the embodiments of the present invention are not limited to merely holding and stabilizing trash cans, but can equally be used to stabilize refuse containers, receptacles or other similar structures.

Now, generally referring to the drawings in which like numerals represent like components throughout the several views, the preferred embodiments of the present invention are next described. The following description of one or more preferred embodiment(s) is merely exemplary in nature and is in no way intended to limit the invention, its application, or uses.

Figure 2:
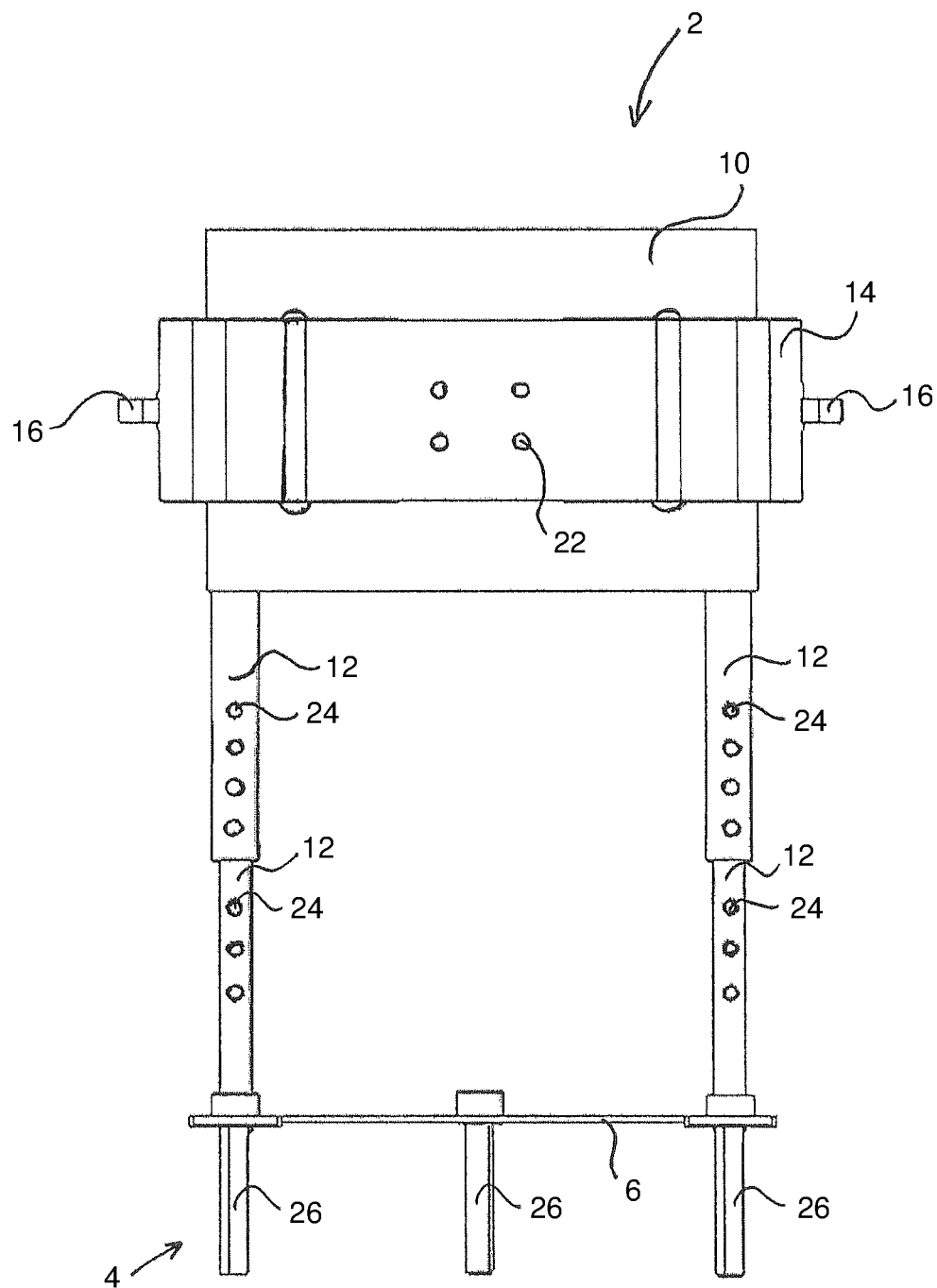
FIG. 2 is a front view of the trash can stabilizer in accordance with an embodiment of the present invention.

FIGS. 1-4 depict the various embodiments of the present invention. In a first embodiment, the present invention specifically relates to a trash can stabilizer 2, which is composed of several individual structural units, wherein the individual structural units are best depicted in FIGS. 1 and 2. The main core components of the trash can stabilizer 2 in accordance with the preferred embodiment of the present invention comprise: i) a base leg 4 made up by at least two flat base plates 6, wherein the at least two of the base plates are situated opposite one another on the trash can stabilizer 2, and are in direct perpendicular physical communication via a third base plate 6 forming the back portion of the base leg 4, ii) a back plate 10, which has a plurality of back plate holes 22 thereon, such that the trash can stabilizer 2 can be securely mounted on a vertical fixed surface, iii) at least two vertically adjustable support bars 12 having a plurality of support bar holes 24, and thanks to these support bar holes 24, the height of the support bars 12 can be conveniently adjusted at a desired level prior to use, and the chosen height can subsequently be secured by placing pins through the support bar holes 24 and iv) at least one arcuate shaped flexible arm 14 having a plurality of loops 16 attached to the sides of the flexible arm 14, wherein the arcuate shaped flexible arm is in a direct communication with, and is extending horizontally from the back plate 10, and further wherein the flexible arm 14 can easily conform to any shape or size of a trash can 20, whereby the flexible arm 14 can securely keep the trash can 20 in place, and can thereby stabilize the trash can 20 without the trash can 20 collapsing or tipping over.

Without being limited, a person having ordinary skill in the art will appreciate that typically the base leg 4 characterized by the plurality of flat base plates 6; the back plate 10; the support bars 12 and the arcuate shaped flexible arm 14 may be constructed from a metal, mixture of a plurality of metals, or may be thermoformed using a plastic material such as but not limited to polyethylene or the like. An immediate advantage of the trash can stabilizer 2 of the present invention is that the base leg 4 encompassed by the plurality of the flat base plates 6 are constructed thin enough, such that objects can roll or slide over them also advantageously eliminating a trip hazard, if the trash can stabilizer 2 is mounted and placed over a sidewalk.

As best demonstrated in FIG. 1, another advantage of the trash can stabilizer 2 is that the minimum and maximum lengths of the base leg 4 can conveniently be adjusted at a desired level chosen exclusively by the user via the plurality of the flat base plates 6 that can be slid in a horizontal direction along a track 8 constructed on the base leg 4. As such, this unique feature affords great flexibility and advantage for the user when the area for installing the trash can stabilizer 2 is restricting and increased maneuverability is consequently required for installment by the user. The trash can stabilizer 2 can thereafter be mounted onto the ground securely for example by using studs or stakes 26. Other mounting arrangements are possible and a skilled artisan would understand that any other material rendering the trash can stabilizer 2 in a substantially stationary and fixed position can be utilized for mounting.

Yet another benefit is the fact that the trash can stabilizer 2 can be mounted as a fixed stationary entity onto the ground, as well as on a vertical fixed surface such as a wall or any other fixed area. This feature is made possible thanks to the aforementioned back plate 10 having a plurality of back plate holes 22 and the support bars 12 having a plurality of support bar holes 24 built thereon, which is best viewed in FIG. 2. As such, a user is afforded another flexibility as the height of the support bars 12 can conveniently be vertically adjusted at a desired level, which simplifies the procedure for setting up the trash can stabilizer 2 for the user. When a suitable height for the support bars 12 has been chosen, the height is locked and stabilized by using pins or other such material. The trash can stabilizer 2 is subsequently anchored on a vertical fixed surface by taking advantage of the back plate holes 22. For this specific purpose, any material besides employing studs or stakes 26 that is readily available to a person of ordinary skill in the art may be utilized, which will ensure that the back plate 10 is mounted strongly enough, such that the trash can stabilizer 2 stays fixed in direct physical communication with the vertical surface at all times. This can be achieved by nailing the back plate to a wall or port, or by bolting it to a fence or other vertical structure.

Yet another benefit of the trash can stabilizer 2 is the unique feature of the arcuate shaped flexible arm 14, which is in direct physical communication with the back plate 10 and extends horizontally from the back plate 10. As best viewed in FIGS. 1-3, the ends of the arcuate shaped flexible arm 14 curve in an outward direction, and this curvature 18 advantageously ensures that enough tension is provided at all times, such that the flexible arm 14 will hold and stabilize the trash can 2 even during the worst imaginable conditions. The unique design of the flexible arm 14 further allows the user to pass trash cans 2 of virtually any shape or size in and out of the vicinity of the trash can stabilizer 2 smoothly and without any complication. The opposite arcuate construction 18 of the forward ends of the flexible arms facilitates insertion of the trash can into the arms as the body of the can will push apart the two arms to allow the can to be inserted into the opening between the arms.

The flexible arm 14 may be constructed with loops 16 added to the sides substantially in the mid-section portion of the flexible arm 14. Consequently, the benefit afforded by the loops 16 is such that a chain, elastic band or cord can run across the top of the lid, with one end attached to one loop, and the other end attached to the other loop. If desired, hooks can be provided at the ends of the band or cord to facilitate attachment to the loops. As such, the benefit of having the loops manufactured on the flexible arm 14 now becomes apparent, as the tension created by the chain, cord or elastic band when mounted onto the loops 16, will physically hold the trash can lid securely upon the trash can 2. Therefore, the loops 16 can provide an additional advantage of employing increased tension on the flexible arm 14 afforded additionally as described hereinabove by the curvature 18 provided by the ends of the flexible arm 14. Without being bound by theory, placing the loops 16 at substantially in the mid-section portion of the flexible arm 14 would beneficially provide the greatest achievable tension on the flexible arm 14.

Figure 3:
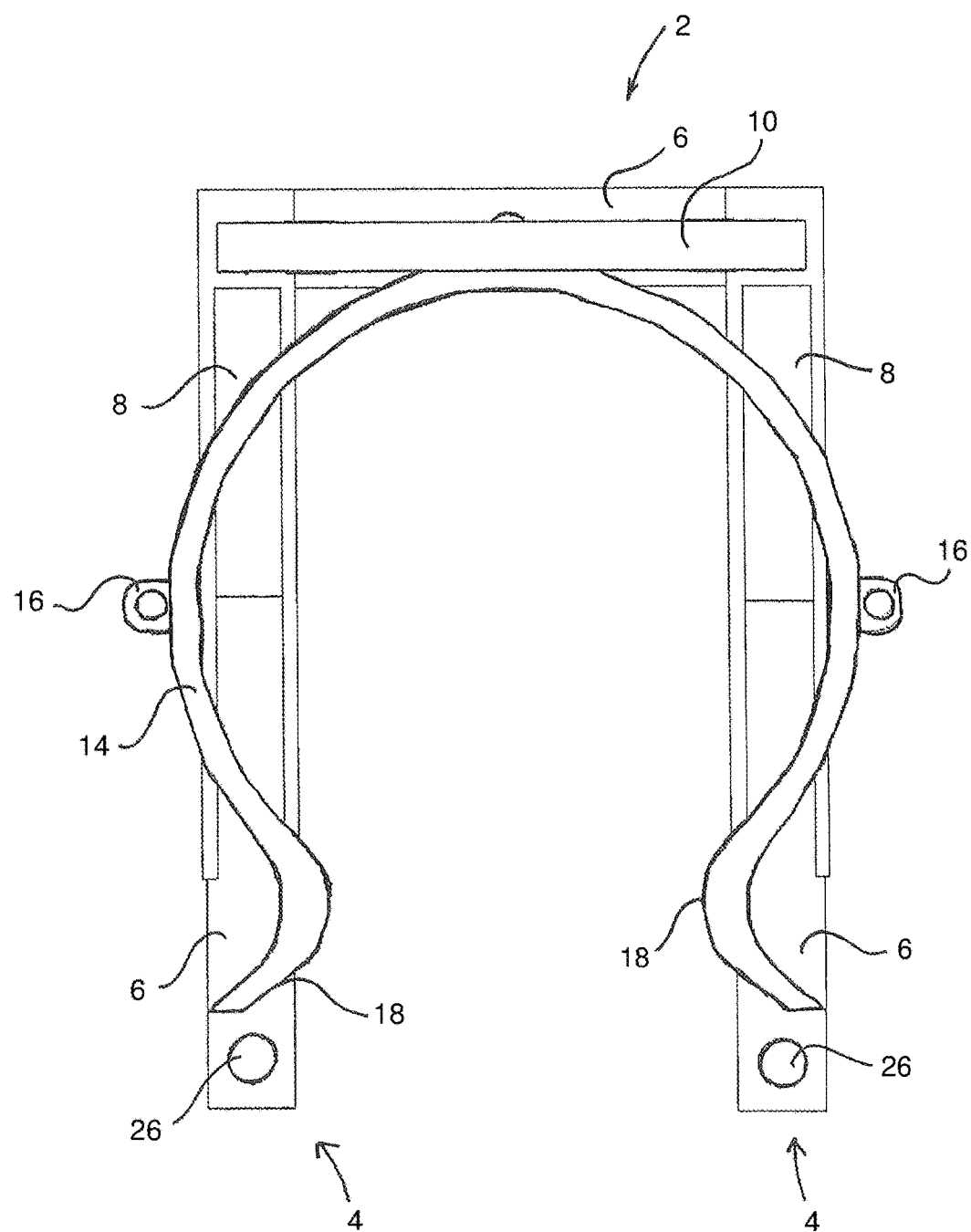
FIG. 3 is a top view of an embodiment of the trash can stabilizer.
Figure 4:
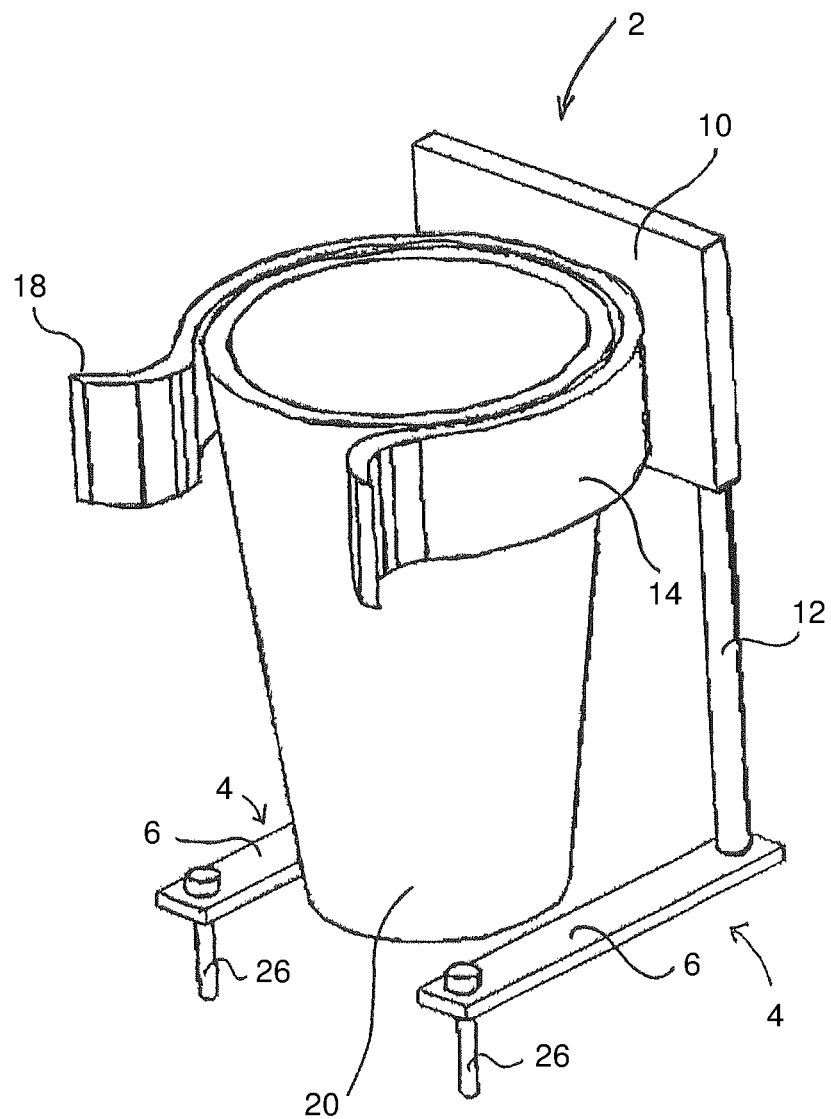
FIG. 4 is a perspective view of the trash can stabilizer in use holding a trash can in accordance with another embodiment of the present invention.

A second embodiment of the trash can stabilizer 2 is depicted in FIG. 4. The only differences between the first embodiment described hereinbefore and in FIGS. 1-3 and the second embodiment of the trash can stabilizer 2 shown in FIG. 4 is that the base leg 4 is composed of at least two non-slidable flat plates 6, and the third base plate 6 forming the back portion of the base leg 4, which is present in the first embodiment, is not present in this embodiment. Additionally, in this embodiment, the loops 14 are also not present on the flexible arm 14.

A skilled artisan would immediately realize a number of additional variations of the invention. As noted above, the back plate alone is sufficient to be attached to a wall or fence using appropriate fasteners so that the stabilizer can be placed in a desired location for stabilizing and supporting the trash can. Alternatively, the device can be mounted on the ground using the embodiments of FIG. 1 or 4. In those embodiments, it would also instead be acceptable to utilize a single support bar rather than two provided that the single bar is appropriately secured in a hole with cement to hold the structure upright.

Now generally referring to FIGS. 1-3, the operation of the first embodiment of the present invention will be outlined and described in greater detail. First the user must start by adjusting the horizontal length of the base leg 4 by sliding the two flat plates 6 along the track 8 constructed on the base leg 4. When a suitable length of the base leg 4 has been determined to be sufficient for a given purpose, the user subsequently inserts studs or stakes 26, or any other material with similar properties of studs or stakes 26, and thereafter mounts the trash can stabilizer 2 onto the ground. Subsequent to mounting the trash can stabilizer 2 onto the ground, the user then has to adjust the vertical height of the support bars 12 at a desired level followed by placing pins or like materials through the support bar holes 24. Following this step, as described above, the user then inserts studs or stakes 26 into the back plate holes 22 and affixes the trash can stabilizer 2 on a vertical fixed support surface. When the trash can stabilizer 2 has been stably mounted onto the ground and the fixed vertical support surface, the user must then place the trash can 20 into the area covered by the arcuate shaped flexible arm 14 by extending the ends of the flexible arm 14 in an outwardly direction simultaneously, and thereby opening the flexible arm 14. Finally, the trash can 20 is placed into the area covered by the flexible arm 14 and the trash can 20 is efficiently stabilized and held in an upright position afforded by the tension created by the flexible arm 14. As previously described, elastic bands or cords can be used to secure the trash can lid to the trash can 2. Also, if greater tension is warranted, elastic bands with hooks extending from the lid of the trash can 2 can optionally and conveniently be connected to the plurality of loops 16 situated on the sides of the flexible arm 14. Other arrangements for holding the lid in a closed position on the top of the trash can include the use of a loop, handle, clip, button, flange, knob, slot, hole, screw, latch, strap, magnet, or stitching. These numerous options present a wide variety of construction possibilities for a skilled artisan who is providing trash can stabilizers in accordance with the present invention.

Figure 5:
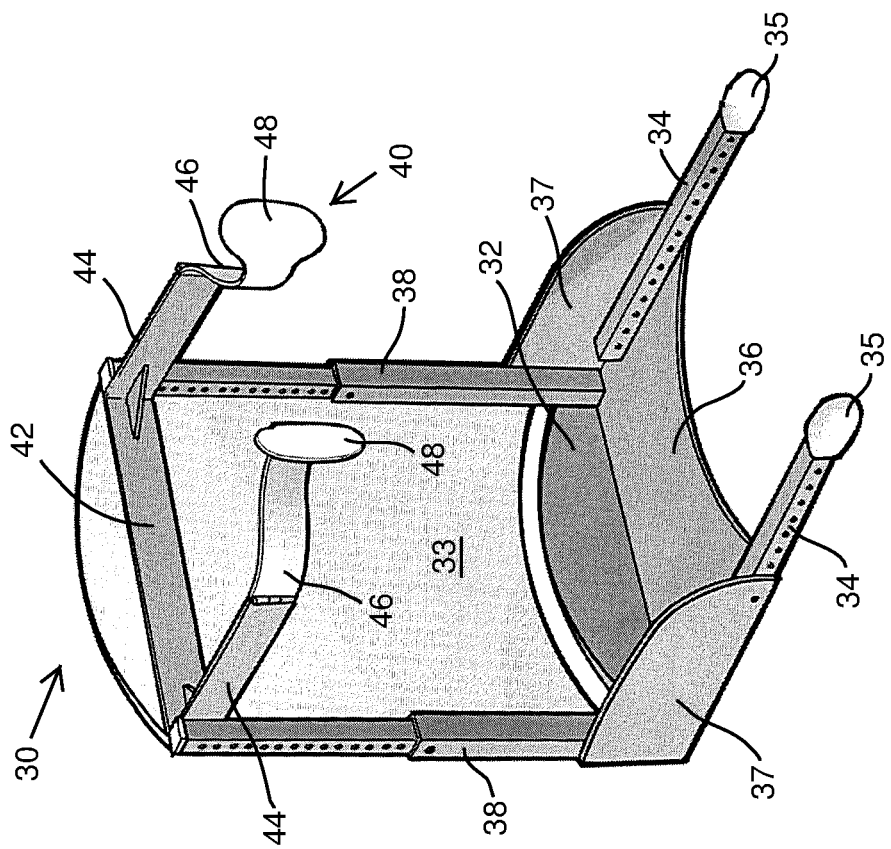

FIG. 5 is a trash can stabilizer 30 in accordance with another preferred embodiment of the present invention. This embodiment comprises a pair of base legs 34 of elongated square rods which are situated opposite one another. Preferably, although not required, the forward ends of the rods can include end caps 35 made of a plastic or elastomeric material to protect the ends of the rods from damage and to provide a more aesthetic appearance. These rods 34 are attached to a flat base plate 36. Also provided are a pair of telescopic support bars 38 that are also in the form of elongated square rods with upper rods that includes a plurality of holes for adjusting the height of the support bars. The upper rods telescopically move vertically within the lower, larger rods. The support bars 38 and base legs 34 are reinforced and additionally connected by side plates 37. Also provided are optional back plates 32, 33 that provide further reinforcement of the stabilizer components. Back plate 32 is attached to both base plate 36 and support bars 38, while back plate 33 is attached to lower portions of the support bars 38.

The stabilizer includes an arm structure 40 that includes cross-member 42, a pair of arm members 44 that have arcuate portions 46 attached thereto and wherein the arcuate portions 46 have pad members 48 attached thereto. The pad members 48 are provided for initial contact with the trash receptacle and which in turn urge the arcuate portions 46 outwardly to open the arm structure 40 so that it can receive the trash can therein. The arm structure 40 is attached to the upper rods of the support bars 38 so that it can be selectively adjusted to a desired height that is best to hold the trash can between the arms 44.

Figure 6:
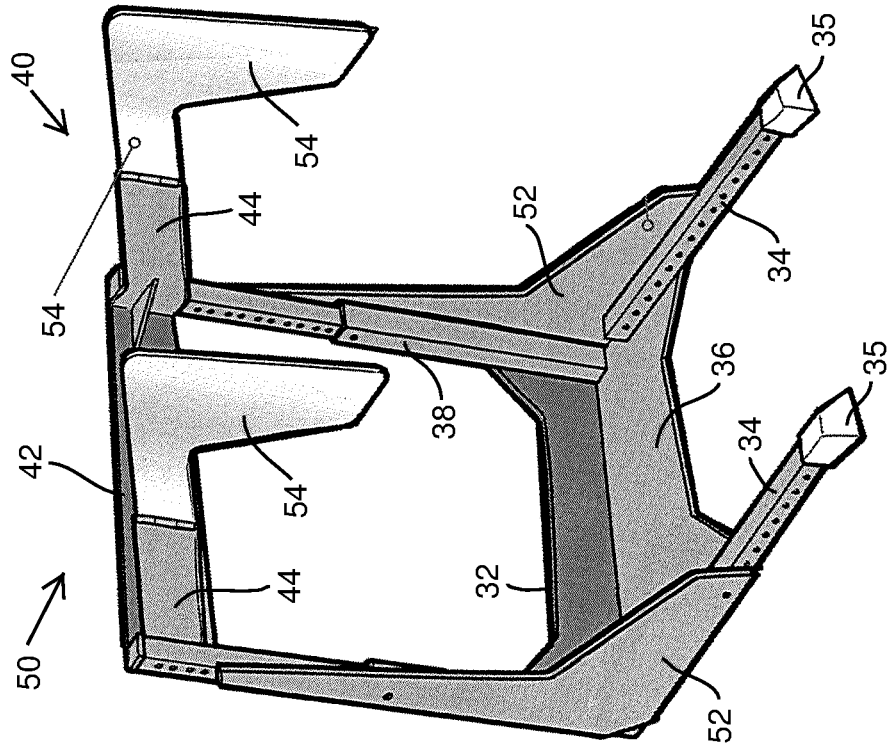
FIGS. 5-11 are perspective views of additional embodiments of the trash can stabilizer of the present invention.

FIG. 6 is another preferred trash can stabilizer 50 in accordance with the present invention. Where features of this embodiment are the same as those of FIG. 5, the same element numbers are used. In this embodiment, the stabilizer 50 is reinforced by providing larger side plates 52 which are L-shaped. These are attached to the both the base plate 36 and lower portions of the support bars 38. Additionally the arm structure 40 that includes cross-member 42 and a pair of arm members 44 also includes forward ends 54 that are L-shaped with the end of the L facing downwardly. The arm members are angled upwardly to provide better balance of the device when it is freestanding while the L-shaped ends facilitate holding contact with a square or cylindrical trash can.

Figure 7:
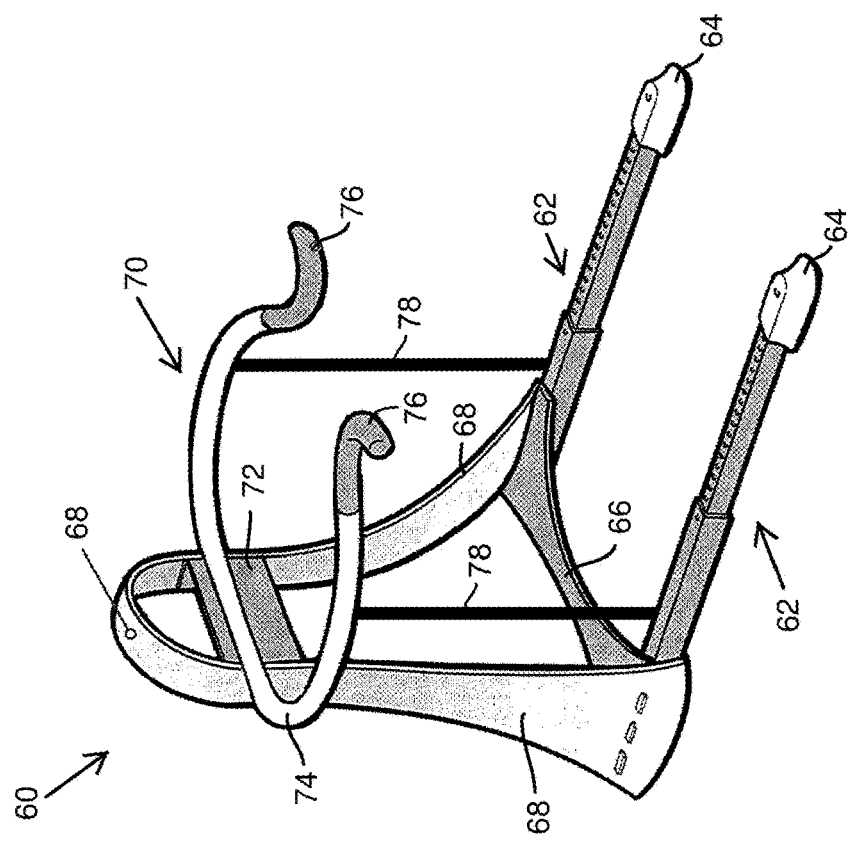

FIG. 7 is another preferred trash can stabilizer 60 in accordance with the present invention. This stabilizer 60 has telescopic legs 62 made of square tube that can be adjusted to a desired length based on the size of the trash can to be retained therein. Preferably, although not required, the forward ends of the rods can include end caps 64 made of a plastic or elastomeric material to protect the ends of the rods from damage and to provide a more aesthetic appearance. These legs 62 are attached to a flat base plate 66. The base plate hold a generally U-shaped vertical support 68 which also includes a cross-plate 72 that provides additional support to the vertical support 68.

The stabilizer includes an arm structure 70 that is attached to the cross-plate 72, a single U-shaped arm member 74 that is arcuate in shape and that include end portions 76 attached thereto. The arm member can be a round or polygon bar made of metal or a plastic, such as PVC. When the arm member 74 is are made of metal, the end portions 76 can be provided with a rubber or plastic cap, sleeve or glove to prevent scratching of the outer surfaces of the trash can when it is placed into or removed from the arms of the stabilizer 60. The arm member 74 is securely attached to the cross-plate 72, such as by welding or bolting. The arm structure 70 is maintained at a specific height that is selected to hold a particular size of trash can therein.

FIG. 7 also illustrates another optional but preferred feature of the invention. As noted, it is typical to use chains, bungee cords or elastic straps to hold the trash can lid in place on the trash can. These are attached to one or both flexible arm members, and are extended or stretched over the lid and through any open lid handle to then engage the opposite flexible arm member. The chains, cords or straps can be mounted onto the arm members by appropriate fasteners or in some situations by welding or even wrapping around the arm members. The chains, cords or bands thus hold the lid on the can. As these chains, cords or bands are attached to the arm members, this could produce forces on those members which causes upward movement and stress on the arm members. To offset this, arm member stabilizers 78 are provided as shown. These arm member stabilizers are typically rods, cords or straps that are attached to the arm members and the base legs to prevent upward movement of the arm members when the chains, cords or bands are attached to the arm members and used to hold the lid on the can. These rods, cords or straps can be attached to the arm members and base legs with appropriate fasteners, Also, the arm member stabilizer rods, cords or bands can be provided with looped portions that fit around the arm members and base legs. Alternatively, attachment loops or other openings can be provided on the arm members or the base legs to facilitate attachment of the arm member stabilizing rods, cords or elastic bands.

Figure 8:
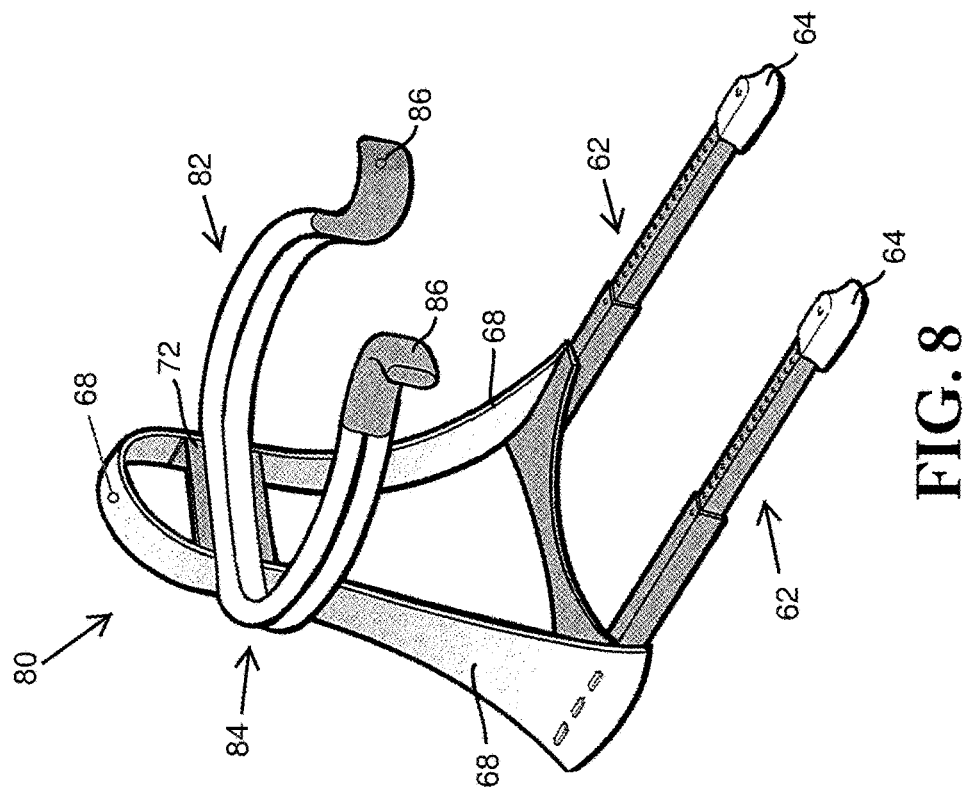

FIG. 8 is another preferred trash can stabilizer 70 in accordance with the present invention. Where features of this embodiment are the same as those of FIG. 7, the same element numbers are used. In this embodiment, the arm structure 82 of the stabilizer 80 has an arm member 84 that is made of two bent bars or rods to provide additional strength in holding the trash can therein. These bars can be made of metal or a plastic, such as PVC. When they are made of metal, as noted, the end portions 76 can be provided with a rubber or plastic cap, sleeve or glove to prevent scratching of the outer surfaces of the trash can it is placed into the arms of the stabilizer.

Figure 9:
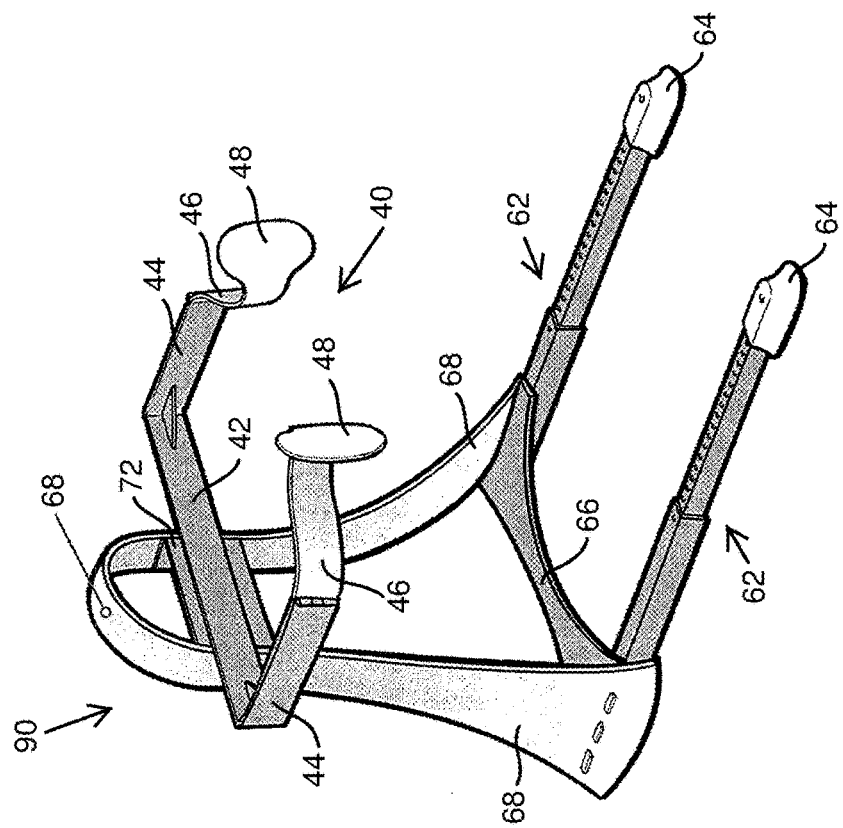

FIG. 9 is yet another preferred trash can stabilizer 90 in accordance with the present invention. Where features of this embodiment are the same as those of FIG. 7 or 8, the same element numbers are used. In this embodiment, the arm structure 40 of the stabilizer 90 is the same as that of FIG. 5 and the same element numbers are used as in that figure to designate the same features. In FIG. 9, the rear plate 42 of the arm structure 40 is fixed in position securely attached to the cross-plate 72, such as by welding or bolting. The arm structure 40 is maintained at a specific height that is selected to hold a particular size of trash can therein.

Figure 10:
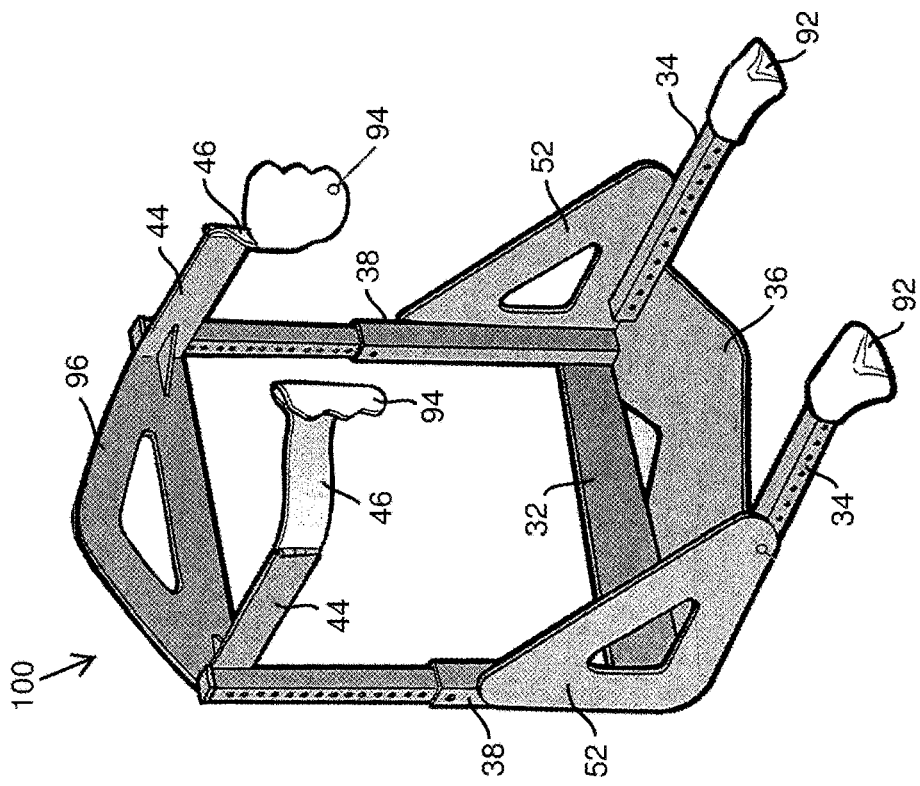

FIG. 10 is another preferred trash can stabilizer 100 in accordance with the present invention. Where features of this embodiment are the same as those of FIG. 5 or 6, the same element numbers are used. In FIG. 10, the stabilizer has certain ornamental features to tie into the proposed device name of CAN KOALA™ wherein the pad members 94 are configured to mimic the paws of a Koala Bear while the end caps 92 of the legs 34 are configured to mimic the feet of a Koala Bear. Typing into the ornamental feature is the use of base plate 36, side plates 52 and rear plate 42 in the shape of an open triangle which mimics the shape of a boomerang. In addition to these nice ornamental touches to the device, the open triangle plates provide good reinforcement strength at a lower weight due to the opening in the center area of each triangular plate.

Figure 11:
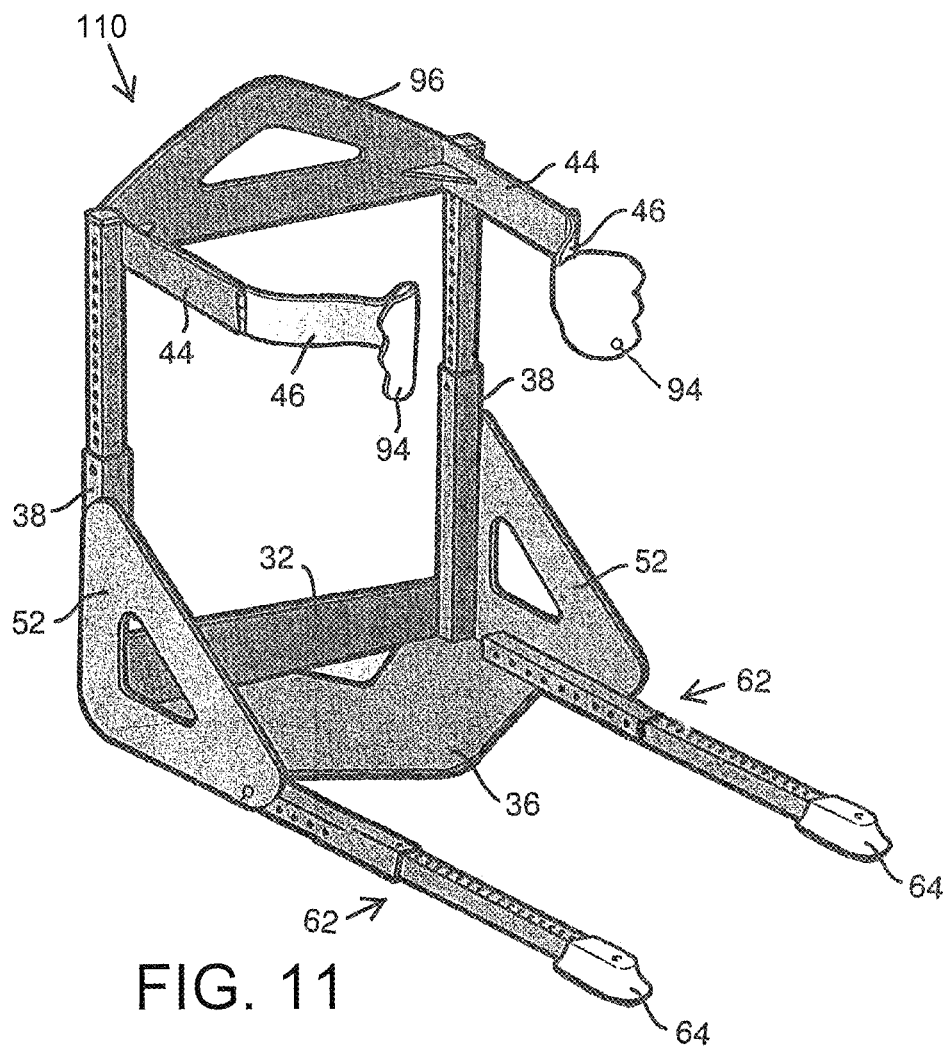

FIG. 11 illustrates another preferred trash can stabilizer 110 in accordance with the present invention. The features of this embodiment combine the adjustability of the legs as shown in the embodiment of FIG. 9 with the vertical adjustability of the support bars as shown in the embodiment of FIG. 10. Thus, the same numerals same element numbers for those figures are used for FIG. 11.

FIGS. 5-11 illustrate that the stabilizers depicted therein can be used as a freestanding device although in preferred embodiments wither the back plate of support bars can be attached to a structure such as the side of a building or a pole for further resistance to movement or tipping over of the stabilizer beyond that which is provided by the legs. Also, in these embodiments the arms members are sufficiently flexible to be moveable to a position for receiving the trash can therein but are also configured to provide sufficient force to return to their original position to securely hold the trash can from unintended or undesired movement. And each flexible arm can be provided with at least one loop attached thereto for receiving a rope, cord or elastic band to assist in holding the trash can between the arms or to prevent downward movement of the flexible arm.

It should also be noted that any of the arm structures can be used with any of the leg structures and side or back supports as disclosed herein. These components can be sleeved for the features they provide to construct any type of stabilizer for a particular trash can or series of trash cans. The various selections fall completely within the skill of an artisan that would have the benefit of this disclosure before them.

In sum it is to be understood and realized that since numerous modifications and changes will readily be apparent to those having ordinary skill in the art it is not desired to limit the invention to the exact entities as specifically demonstrated in this disclosure. For example, the ends of the flexible arms can be configured to include a square or rectangular shape in order to engage and hold a similarly sized square or rectangular trash container. Of course, straight flexible arms can also be used but the invention is more adaptable to the use of flexible arms with ends that more or less conform to the shape of the trash can to be stabilized. Accordingly all suitable modifications and equivalents may be resorted to falling within the scope of the invention.

It should also be understood that various features and aspects of the disclosed of the disclosed embodiments can be combined with, or substituted for one another in order to form varying modes of the disclosed invention. As such, the described materials used for the manufacture of the trash can stabilizer, and methods of use should not only be construed to be limited to specifically cover what has exclusively been described in this disclosure.

Unless defined otherwise, all technical and scientific terms used herein have same meaning as commonly understood by the person of ordinary skill in the art to which this invention belongs. Thus the scope of the embodiments of the present invention should be determined by the appended claims and their legal equivalents rather than by the Figures.

What is claimed is:

1. A trash can stabilizer comprising:
   a back plate for providing a flat vertical surface; and
   a pair of elongated, flexible arms associated with and extending horizontally away from the back plate, each arm having a first portion which faces that of the other arm and is initially positioned so that an opening is provided between the first portions of the arms, wherein the opening is smaller than the trash can that is to be received therein, with the arms extending past a plane positioned parallel to the back plate and extending through the center of the trash can to be received within the arms, and wherein the forward ends of the arms are also spaced apart from each other, wherein the forward end of each flexible arm includes an arcuate portion that faces away from the opening to facilitate movement of the arms away from each other from their initial position when the trash can passes past and between the forward ends of the arms so that the trash can is insertable into the opening by contacting the arcuate portions and moving the forward ends of the arms away from each other and after being inserted therein, the arms contact and secure the trash can therebetween as the flexible arms attempt to return to their initial position.

2. The trash can stabilizer of claim 1, wherein each flexible arm is attached to the back plate and extends horizontally away from the back plate.

3. The trash can stabilizer of claim 1, wherein the flexible arms have second, rearward portions that are joined together and are attached to the back plate.

4. The trash can stabilizer of claim 1, further comprising at least one or two vertically adjustable support bars extending from the back plate towards the ground for placement of the back plate at a predetermined vertical position wherein the flexible arms are located at a height that is sufficient to hold an upper portion of the trash can.

5. The trash can stabilizer of claim 4, wherein two support bars are present each including telescopic portions that are adjustable to place the back plate in the predetermined vertical position.

6. The trash can stabilizer of claim 5, wherein the two support bars comprise a plurality of holes and pin members such that back plate can be adjusted to a desired height by selectively placing pins in the desired holes in the support bars.

7. The trash can stabilizer of claim 5, further comprising a base plate for association with and connection between the support bars for stabilizing the support bars from twisting movement.

8. The trash can stabilizer of claim 7, further comprising at least two additional base plates forming horizontal legs for supporting the support bars in a vertical position, with the legs extending below the flexible arms and away from the support bars.

9. The trash can stabilizer of claim 8, wherein the base plates each include first and second leg members so that the base plates have an adjustable length.

10. The trash can stabilizer of claim 8 wherein the base plates each include an aperture for receiving a stake that can be driven into the ground to secure the stabilizer in position.

11. The trash can stabilizer of claim 8, wherein the flexible arms, back plate, and base plates are made of metal or plastic.

12. The trash can stabilizer of claim 1, wherein each flexible arm includes at least one loop attached thereto for receiving a rope, cord or elastic band to assist in securing the trash can lid to the trash can.

13. The trash can stabilizer of claim 1, wherein each flexible arm includes at least one loop attached thereto for receiving a rod, cord or strap that attaches to a base leg to assist in holding the flexible arm in position to hold the trash can.

14. The trash can stabilizer of claim 13, which further comprises chains, cords or elastic bands on one or both flexible arms for holding a lid on the trash can wherein the rope, cord or strap that is attached to each flexible arm and base leg prevents upward movement of the flexible arm when holding the lid on the trash can.

15. A method for physically holding a trash can in a stationary position comprising the steps of:
   providing a trash can stabilizer according to claim 1; and
   inserting a trash can between the flexible arms and into the opening to stabilize the trash can therein.

16. The method of claim 15, wherein the back plate is mounted on a wall or fence.

17. The method of claim 15, further comprising a base plate and two support bars extending from the back plate towards the ground for placement of the back plate at a predetermined vertical position wherein the flexible arms are located at a height that is sufficient to hold an upper portion of the trash can, wherein the back plate is adjustable to the predetermined vertical position, wherein the support bars are associated with and connected between the base plate for stabilizing the support bars from twisting movement.

18. The method of claim 15, which further comprises providing each flexible arm with at least one loop attached thereto for receiving a rope, cord or strap that attaches to a base leg to assist in holding the flexible arm in position to hold the trash can.

19. The method of claim 18, which further comprises providing chains, cords or elastic bands on one or both flexible arms to hold a lid on the trash can wherein the rope, cord or elastic band that is attached to each flexible arm and base leg prevents upward movement of the flexible arm when holding the lid on the trash can.

20. A trash can stabilizer comprising:

a back plate for providing a flat vertical surface; and a pair of elongated, flexible arms associated with and extending away from the back plate, each arm having a first portion which faces that of the other arm and is initially positioned so that an opening is provided between the first portions of the arms, wherein the opening is smaller than the trash can that is to be received therein, with the arms extending past a plane positioned parallel to the back plate and extending through the center of the trash can to be received therein, and wherein the forward ends of the arms are also spaced apart from each other, wherein the flexible arms have second, rearward portions that are joined together and are attached to the back plate, and wherein the forward end of each flexible arm includes an arcuate portion that faces away from the opening to facilitate movement of the arms away from each other from their initial position when the trash can passes past and between the forward ends of the arms so that the trash can is insertable into the opening by contacting the arcuate portions and moving the forward ends of the arms away from each other and after being inserted therein, the arms contact and secure the trash can therebetween as the flexible arms attempt to return to their initial position; and a base plate and two support bars extending from the back plate towards the ground for placement of the back plate at a predetermined vertical position wherein the flexible arms are located at a height that is sufficient to hold an upper portion of the trash can, wherein the back plate is adjustable to the predetermined vertical position, wherein the support bars are associated with and connected between the base plate for stabilizing the support bars from twisting movement.

* * * * *